May 17, 1927.

C. WOODIN

LINE GUIDE FOR TRACTORS

Original Filed Feb. 5, 1925    2 Sheets-Sheet 1

1,629,014

C. Woodin, Inventor

May 17, 1927.                                                                1,629,014
C. WOODIN
LINE GUIDE FOR TRACTORS
Original Filed Feb. 5, 1925       2 Sheets-Sheet 2
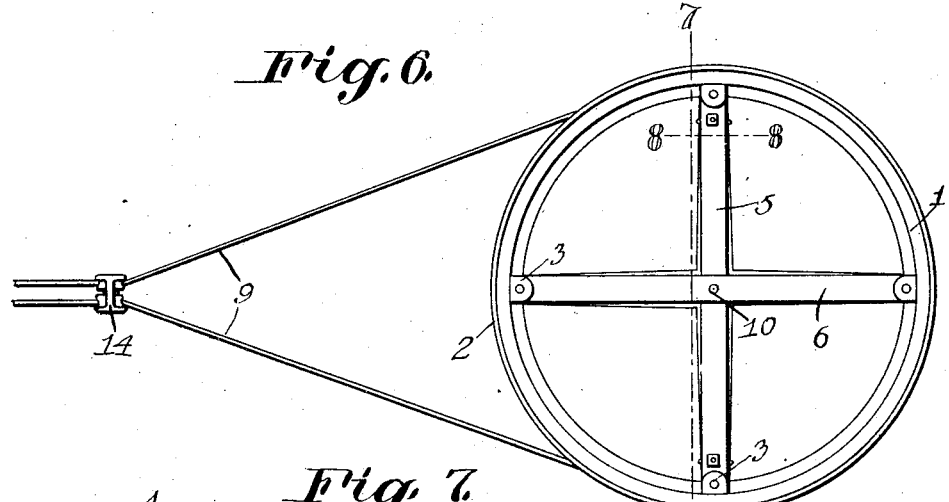
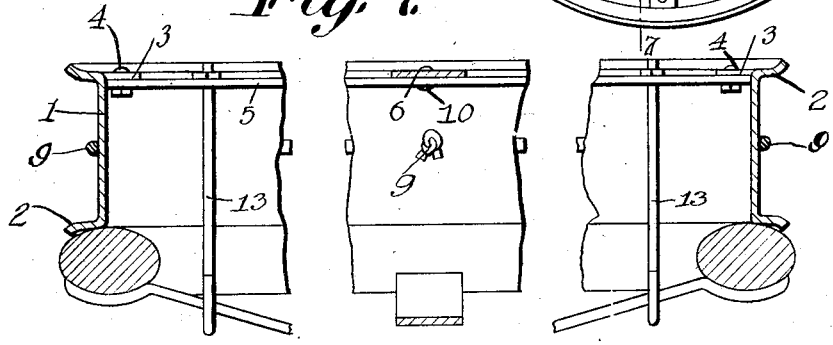
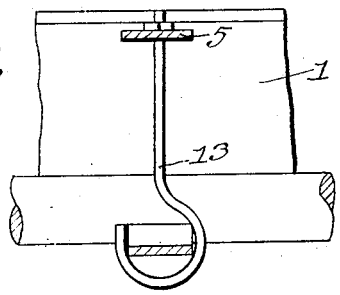
C. Woodin, Inventor
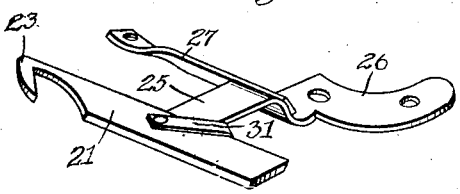

Patented May 17, 1927.

1,629,014

UNITED STATES PATENT OFFICE.

CARL WOODIN, OF POCAHONTAS, IOWA.

LINE GUIDE FOR TRACTORS.

Application filed February 5, 1925, Serial No. 7,034. Renewed April 7, 1927.

The present invention has reference to a device especially designed for use in connection with tractors, the primary object of the invention being to provide novel means for guiding the controlling lines to permit a tractor to be controlled from a point remote from the tractor, enabling the operator to position himself on the agricultural machine drawn by the tractor.

Another important object of the invention is to provide means for locking the clutch lever in its inactive position, the clutch lever being controlled from a point remote from the tractor.

A still further object of the invention is to provide a device of this character which may be readily and easily positioned on a tractor wheel eliminating the necessity of making alterations in the construction of the tractor wheel to install the same.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 6 is a plan view of the guiding mechanism as secured to a steering wheel.

Figure 7 is a sectional view taken on line 7—7 of Figure 6.

Figure 8 is a sectional view taken on line 8—8 of Figure 6.

Figure 9 is a perspective view of the latch member and its supporting means.

Figure 1:
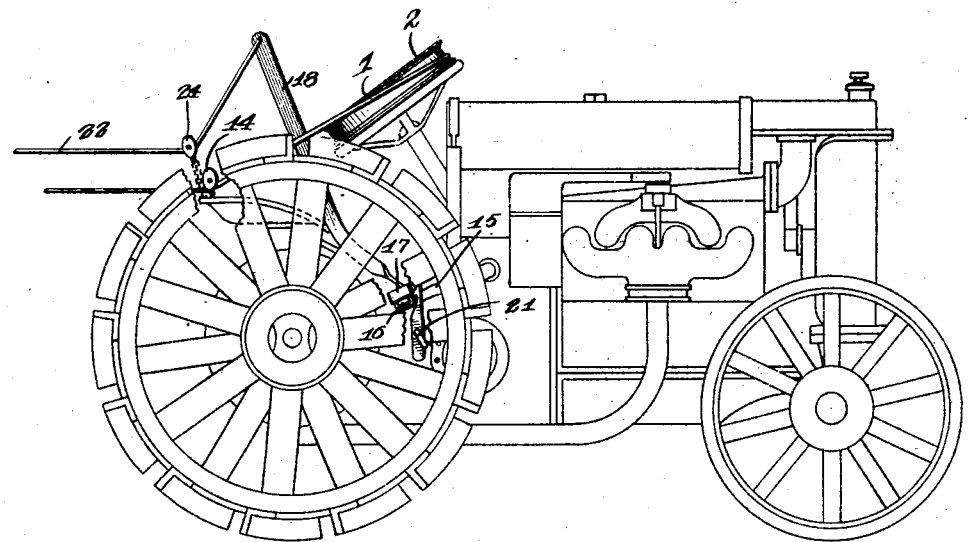
Figure 1 is a side elevational view of a tractor disclosing the steering wheel and guides supported thereon.
Figure 3:
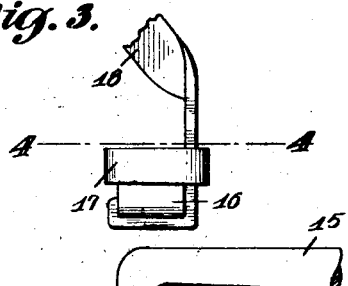
Figure 3 is an end elevational view disclosing the means for securing the lever to the clutch pedal.

Referring to the drawings in detail, the guiding device embodies a circular member 1 which is provided with flanges 2 arranged in spaced relation with each other, which flanges act as guides for the cable to be hereinafter more fully described. Inwardly extended ears 3 form a part of the circular member 1, and are provided with openings to accommodate the bolts 4 that secure the supporting frame to the circular member.

This supporting frame includes cross arms 5 and 6 respectively, which cross arms are provided with openings to receive the bolts 4 whereby the supporting frame may be secured to the circular member 1 in a manner as clearly shown by Figure 6 of the drawings. An opening is formed in the circular member 1 to accommodate the ends of the flexible members 9 so that movement of the flexible members will result in a relative movement of the circular member 1.

As clearly shown by Figure 6 of the drawings, the arms 5 and 6 are pivotally connected at points intermediate their ends by means of the rivet 10. Hook members 13 are carried by the arm 5 and are designed to embrace portions of the spokes of the steering wheel to secure the device thereto. Pulleys 14 accommodate the flexible members 9 and present means to allow the flexible members to move freely while they are in operation, the construction of the pulleys being such as to reduce friction between the flexible member 9 and pulleys to the minimum. It is to be understood that the free ends of the flexible member 9 may extend to a position adjacent to the operator's seat so that the operator may position himself on the agricultural machine drawn by the tractor equipped with the device, to the end that the operator may manipulate the various levers for controlling the agricultural machine, and at the same time have perfect control over the tractor drawing the same.

The usual clutch pedal of a tractor is indicated at 15 and is provided with an upwardly extending end portion 16, over which operates a securing link 17 that is constructed to move vertically over the lever 18. As shown, the lever 18 is provided with an upwardly and inwardly extended portion, which upwardly and inwardly extended portion overlies the pedal, and is indicated at 20. Thus it will be seen that when the lever is positioned on a clutch pedal, the link member 17 may be dropped into position over the member 16 securely locking the lever against movement with respect to the clutch pedal.

Associated with the clutch pedal is a pivoted member 21 which is provided with a hook portion 23 adapted to hook over the clutch pedal to hold the clutch pedal in its inactive position when the lever has been pulled to move the clutch pedal to its inactive position.

An opening is formed in the outer end of the lever 18 and accommodates one end of the flexible member 22 that operates through the pulley 24, the opposite end of the flexible member 22 being arranged adjacent to the operator's seat to permit the operator to readily control the clutch pedal from a point remote from the tractor. Should it be desired to return the clutch member to its initial position, and release the hook member, a slight pull of the lever directed thereto by means of the flexible members 22, will cause the latch member to move rearwardly and disengage the clutch pedal allowing it to return to its active position.

Figure 2:
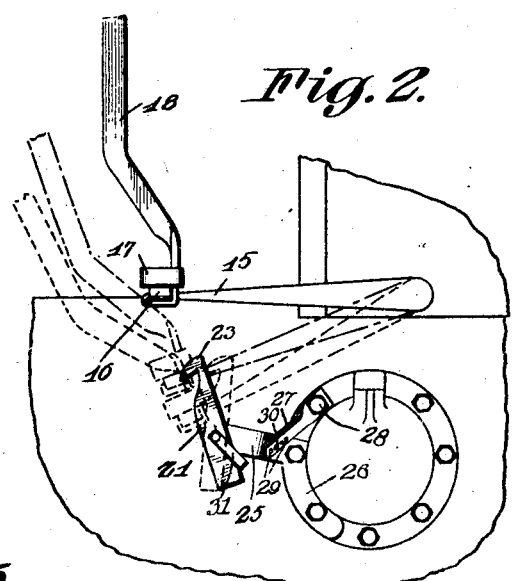
Figure 2 is a detail view disclosing the latch member and means for operating the same.
Figure 4:
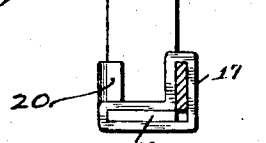
Figure 4 is a sectional view on line 4—4 of Figure 3.
Figure 5:
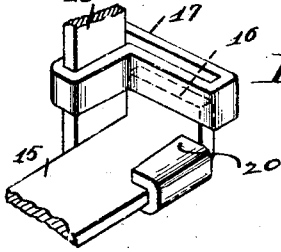
Figure 5 is a perspective view of the means for securing the operating lever to the clutch pedal.

As clearly shown by Figure 2 of the drawings, the member 21 is pivotally supported at the free end of the arm 25, which is curved as at 26 to permit it to be positioned adjacent to the transmission housing. Forming a part of the support is an adjustable arm 27 which is secured to the housing of the tractor as at 28, the opposite end of the arm 27 being provided with a plurality of openings 29 that accommodate the screw 30 thereby allowing the arm to be adjusted for use in connection with various types of tractors.

Carried by the arm 25 is a guarding member indicated at 31 in which guarding member the latch member moves, the construction of the guarding member being such as to restrict movement of the latch member and prevent it from moving to a position under the clutch pedal and insure the proper operation of the latch member.

I claim:—

1. A controlling device for controlling motor vehicles comprising a clutch pedal having an upwardly extended end portion, a lever having a laterally and upwardly extended portion adapted to embrace the clutch pedal at a point adjacent to the upwardly extended flange, a vertically movable securing member mounted on the lever and adapted to be positioned over the upwardly extended flange to lock the lever to the clutch pedal.

2. A controlling device for controlling motor vehicles comprising a clutch pedal having an upwardly extended flange formed at its free end, a lever having a right angled end portion formed with a hook to fit over the clutch pedal, and means carried by the lever and adapted to move over the upwardly extended flange of the clutch pedal, to secure the lever to the clutch pedal.

In testimony that I claim the foregoing as my own, I have hereto affixed my signature.

CARL WOODIN.